May 20, 1969  E. L. CHADWICK  3,444,907
SAW CHAIN
Filed March 10, 1967  Sheet 1 of 3
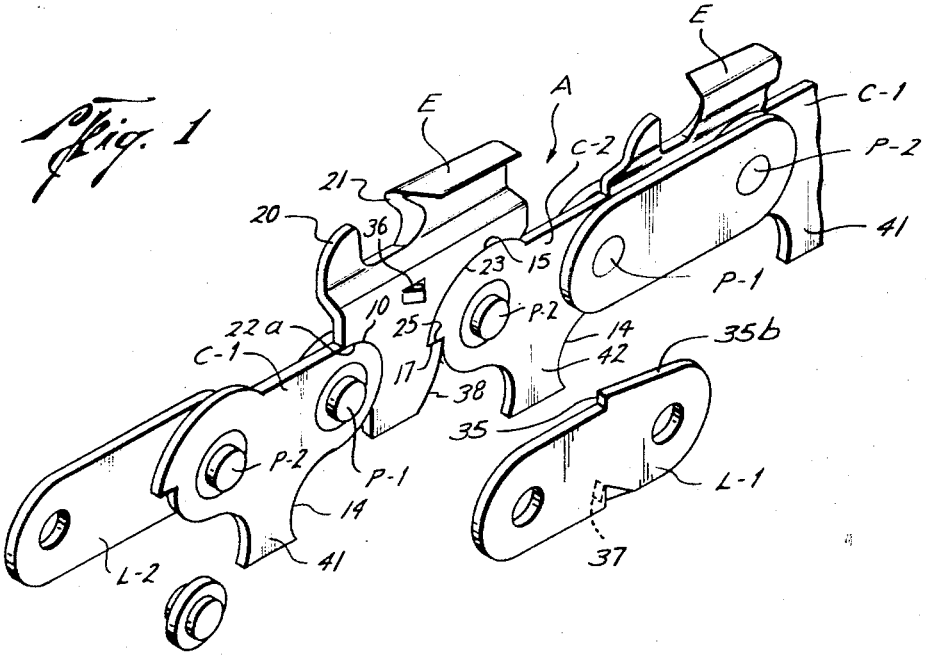
Fig. 1
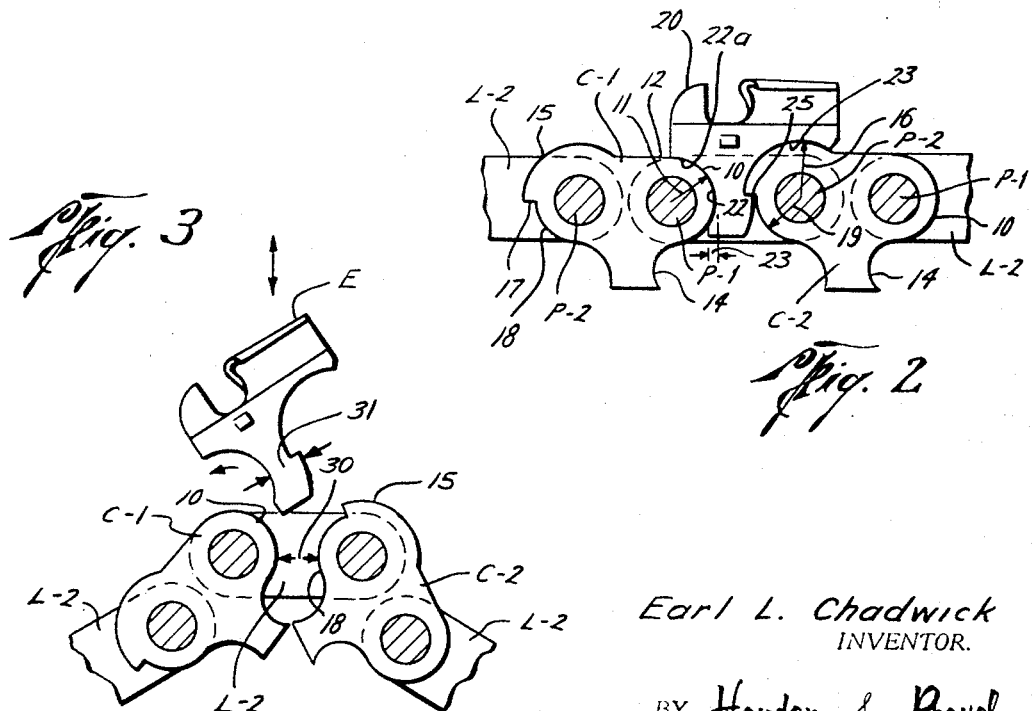
Fig. 3
Fig. 2
Earl L. Chadwick
INVENTOR.
BY Hayden & Pravel
ATTORNEYS May 20, 1969  E. L. CHADWICK  3,444,907
SAW CHAIN
Filed March 10, 1967  Sheet 2 of 3
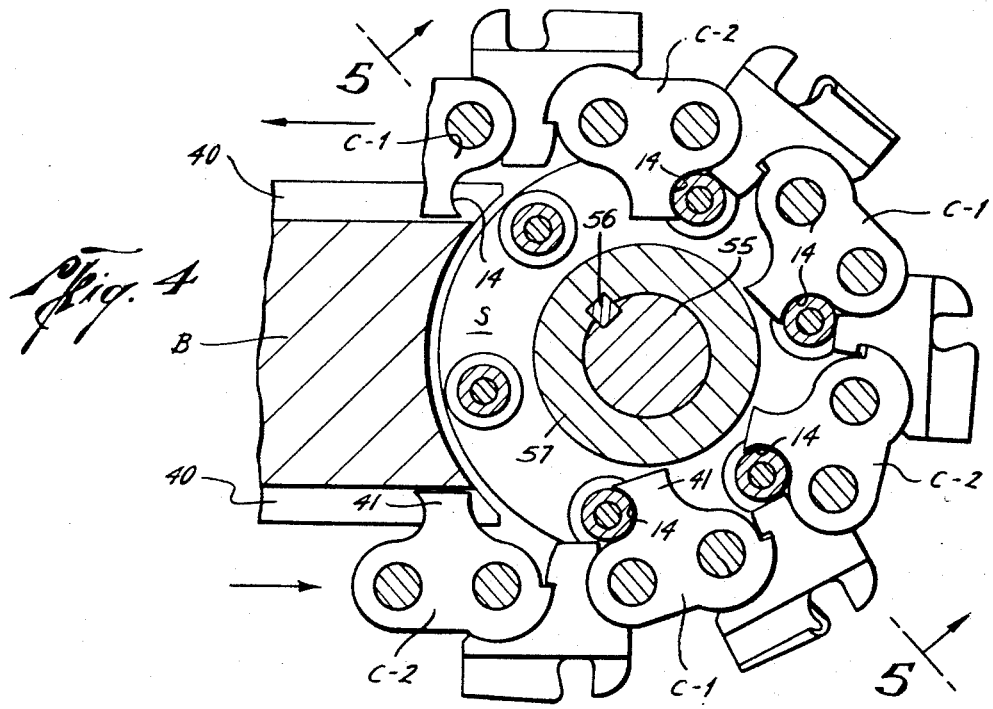
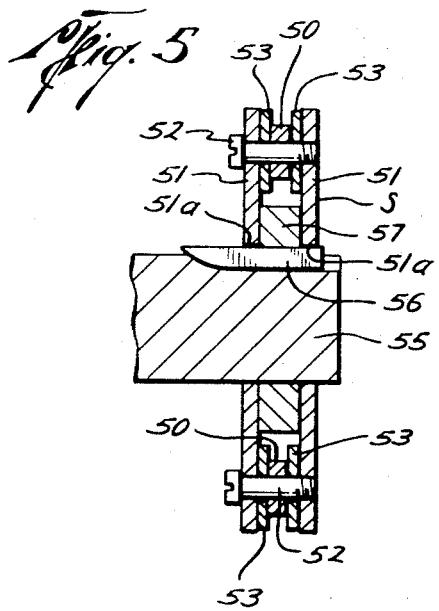
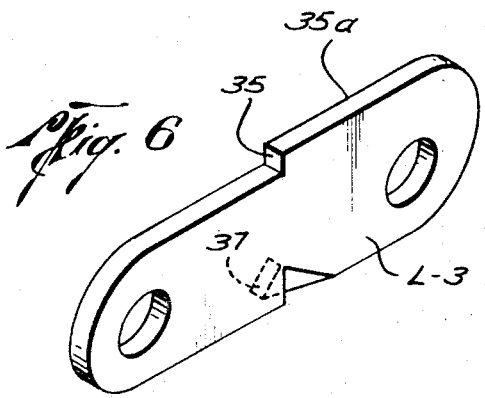
Earl L. Chadwick
INVENTOR.
BY Hayden & Pravel
ATTORNEYS May 20, 1969     E. L. CHADWICK     3,444,907
SAW CHAIN
Filed March 10, 1967
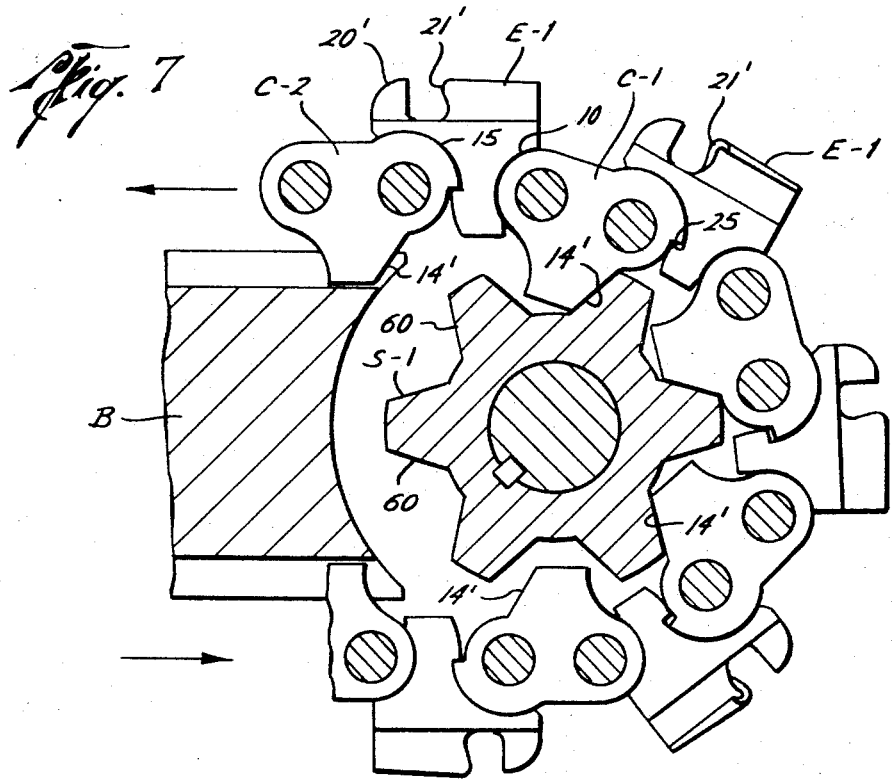
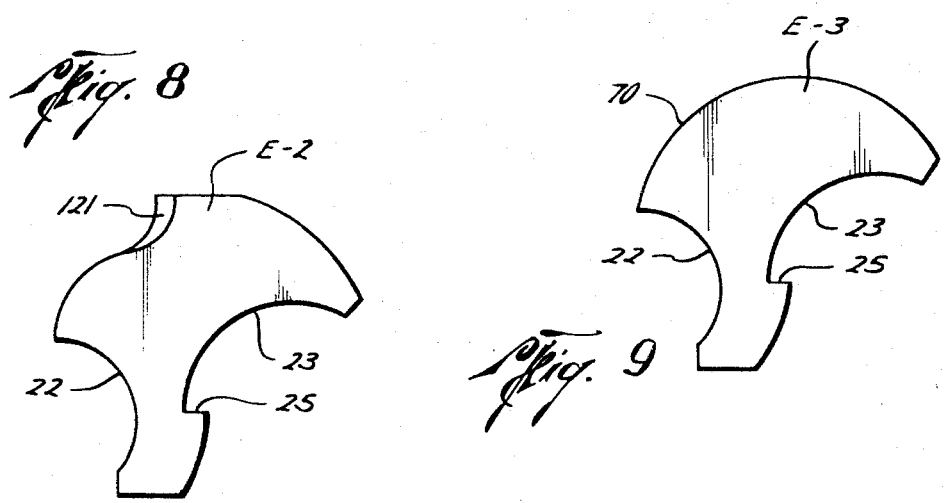
Earl L. Chadwick
INVENTOR.
BY Hayden & Pravel
ATTORNEYS United States Patent Office 3,444,907
Patented May 20, 1969

3,444,907
SAW CHAIN
Earl L. Chadwick, P.O. Box 4484,
Portland, Oreg. 97208
Filed Mar. 10, 1967, Ser. No. 622,350
Int. Cl. B27b 33/14
U.S. Cl. 143—135                                    8 Claims

ABSTRACT OF THE DISCLOSURE

A saw chain having removable cutter teeth each of which is individually locked in place by the adjacent parts of the chain without rivets and each of which may be individually removed for replacement or repair by a manual manipulation of the saw chain and without any tools. The cutter teeth are locked in the saw chain so as to inhibit sloppy jumping of the cutter teeth as the saw chain moves at high speeds, thereby substantially eliminating gouging by providing substantially uniform cutting with all of the cutter teeth in the saw chain.

Background of the invention

The field of this invention is saw chains which may be used for cutting trees, coal, granite, cement, hay mowing and any other cutting operation. In United States Patent No. 3,224,476, granted to Earl L. Chadwick on Dec. 21, 1965, a saw chain having removable cutter teeth which are locked into the saw chain without rivets and which are removable without special tools is disclosed. Although such construction is considered satisfactory under many conditions of use, it is subject to some jumping at high speeds with consequent gouging.

Summary of the invention

The present invention is an improvement on the saw chain of said United States Patent No. 3,224,476 in that it locks each individual cutter tooth in the saw chain so as to be substantially rigid therewith as the saw chain moves in its endless cutting path, while at the same time enabling each of said cutter teeth to be removed separately as desired for replacement or repair without requiring the removal of any rivets or the use of any tools. Additionally, the present invention may include alternate stabilizing inserts which further improve the rigidity of the saw chain to thereby further assure that gouging and uneven cutting will be inhibited.

Brief description of the drawings

FIG. 1 is an isometric view of a portion of the saw chain of the present invention, with certain parts exploded for clarity of illustration;

FIG. 2 is an elevation of the saw chain of the present invention, with a cutter element in cutting position and with the connecting link removed for illustration;

FIG. 3 is a view similar to FIG. 2, but illustrating the position of adjacent saw chain links during the removal of, or the insertion of, a cutter element or other insert element;

FIG. 4 is a vertical sectional view, partly in elevation, of the drive sprocket end of the saw chain, showing a new improved drive sprocket in combination with the saw chain of the present invention;

FIG. 5 is a view taken on line 5—5 to show the drive sprocket of FIG. 4 only;

FIG. 6 is an isometric view showing a modified connecting link which is suitable for stabilizing the insert elements of the saw chain of this invention;

FIG. 7 is a view similar to FIG. 4, but illustrating a conventional drive sprocket in combination with a modified saw chain construction of this invention;

FIG. 8 is an elevation of an alternate form of insert cuter element which may be used with the saw chain of the present invention; and FIG. 9 is a stabilizing element which is adapted to be inserted in alternate positions with respect to a cutting insert element in the saw chain of the present invention to improve the rigidity and efficient cutting with the saw chain.

Description of the preferred embodiments

In the drawings, the letter A designates generally the saw chain apparatus of the present invention which is of the general type shown in United States Patent No. 3,224,476. The saw chain apparatus A is adapted to be disposed in an endless assembly which is power driven at relatively high speeds for the cutting of wood, or any other suitable material. Briefly, the saw chain apparatus A includes a plurality of saw chain links C–1 and C–2 which preferably are identical in construction and which are connected together by suitable pivot pins or rivets P–1 and P–2. The adjacent saw chain links C–1 and C–2 are held in a predetermined spaced and connected relationship by a pair of connecting links L–1 and L–2 which likewise are secured to the pivot pins P–1 and P–2. Between the adjacent ends of each of the pairs of saw chain links C–1 and C–2, a pocket is formed, as will be more fully described, for receiving an insert element E (FIG. 1), which element E is held in position by a locking action of the adjacent saw chain links C–1 and C–2, and without any rivets or other fastening means, whereby the individual elements E of the saw chain apparatus A may be removed separately for replacement or repair.

Concerning the invention more in detail, the chain link C–1 is formed with an externally curved end surface 10 which as a radius 11 from the center of the pivot pin P–1 which is uniform and which merges with a straight outer surface 12. The lower portion of the externally curved surface 10 merges with a reverse curved drive surface 14, which is adapted to be engaged by a sprocket of special construction as will be described hereinafter.

The saw chain link C–2 is provided with an externally curved surface 15 which has a radius 16 and which terminates at a laterally extending shelf 17 which is disposed at an intermediate portion of the end surface of the saw chain link C–2. The inner curved surface 18 of the link C–2 is also preferably curved and has a radius as indicated at 19 which is less than the radius indicated at 16. The radiuses 16 and 19 are measured from the center of the pivot pin P–2. At this point, it should be noted that the links C–1 and C–2 are actually duplicates of each other, and each has the surfaces and constructions heretofore described with respect to the other, but such surfaces are disposed so that the external surface 10 of link C–1 is adjacent to, but spaced from, the externally curved surface 15 of link C–2 so as to provide a space longitudinally therebetween for receiving each insert element E, as will be explained. The connecting links L–1 and L–2 are connected to the pivot pins P–1 and P–2 so as to determine the amount of the longitudinal spacing between the surfaces 10 and 15. Such connecting links L–1 and L–2 may both be plain links of the configuration indicated at L–2, although one of the links may be modified as indicated at L–1 and as will be more fully described.

The insert element E is actually a cutter element, although other types of insert elements may be employed, as will be more evident hereinafter. The cutter element E has a guide projection 20 at its forward end and a cutter edge 21 for cutting into the wood or other material being cut with the saw chain apparatus A. The inner portion of the element E is provided with an internally curved surface 22 which conforms generally to the radius or curvature of the externally curved surface 10 of the saw chain link C–1. It is to be noted that the curved surface 22 extends for a distance indicated at 23 beyond the maximum inward extension of the surface 10 so that the element E cannot move outwardly relative to the chain link C–1 during the cutting action. Also, it is to be noted that the outer end 22a of the curved surface 22 engages the substantially straight outer surface 12 of the saw chain link C–1 to provide rigidity and stability during the cutting action to prevent gouging and uneven cutting.

The element E also has a second inner curved surface 23 which conforms generally with the curvature of the externally curved surface 15, and it terminates in a shoulder 25 which is adapted to engage the shelf 17 to firmly lock the element E in position between the saw chain links C–1 and C–2 during cutting action. It is to be noted that the insert element E is confined against tipping or jumping relative to the saw chain links C–1 and C–2 since it is locked against such action by the contact of the surface 25 with the shelf 17 and by the upper surface 22a with the straight surface 12, as previously described.

To remove the insert element E, the saw chain is loosened so as to render it slack and then the adjacent links C–1 and C–2 are pivoted inwardly or downwardly as shown in FIG. 3 so as to provide an increased longitudinal opening 30 between the surfaces 10 and 18 as compared to the opening which is normally between the surfaces 10 and 15 during the use of the chain saw for sawing purposes. Such opening 30 is wide enough so that the lower portion of the insert element E and particularly the width indicated at 31 (FIG. 3) may pass therebetween as the element E is moved outwardly with respect to links C–1 and C–2. To facilitate the release of the element E, it is moved upwardly and slightly to the left about the surface 10, as viewed in FIG. 3. The reverse procedure is employed for inserting a tooth or element E between a pair of the saw chain links C–1 and C–2.

To further stabilize the saw chain apparatus A, the link L–1 is preferably formed with an upper or outer shoulder 35 which is adapted to engage a tab 36 which is deformed out of the material of the insert element E or is otherwise formed therewith. Also, the link L–1 preferably has a tab 37 which extends towards the lower portion of the element E and engages with the inwardly extending surface 38 of the element E. Similarly, the link L–2 may be formed with a shoulder 35 at its outer portion and a tab 37 which extends in the opposite direction to that illustrated for the link L–1 since alternate cutting elements E are preferably reversed as shown in FIG. 1.

For the purpose of driving the saw chain apparatus A, it is mounted on a conventional saw bar B which has grooves or channels 40 along its outer edges for receiving the guide extensions 41 and 42 of the links C–1 and C–2. As previously explained, each of the links C–1 and C–2 is preferably identical but they are numbered differently for purposes of description. Each has a drive surface 14 which is adapted to be engaged by one of the roller sleeves 50 of the drive sprocket S. The roller sleeves 50 are preferably formed of hardened material so as to minimize wear. The sprocket S is formed with a pair of plates 51 which are held together by any suitable means such as retaining the screws 52 which serve as the pivot pins for each of the sleeves 50. Guide washers 53 are preferably provided on each side of the rollers 50. The rollers 50 provide for a driving action while at the same time permitting a rolling with respect to the surfaces 14 so as to minimize wear and friction during the driving action. The plates 51 have a central opening 51a through which a drive shaft 55 extends and which is keyed thereto by a key 56. A central hub 57 between the plates 51 may be welded to the plates 51 and also keyed to the key 56 as best seen in FIGS. 4 and 5. Thus, rotation of the drive shaft 55 by any suitable power source such as a gasoline engine imparts rotation to the sprocket S for thereby rotating the drive sleeve 50, whereby the saw chain links C–1 and C–2 are driven at a relatively high speed for the cutting action. It should be noted that the radius of each of the surfaces 14 is preferably larger than the radius of the roler sleeves 50 so as to permit a rolling action of the saw chain links C–1 and C–2 as they are driven around the sprocket S, thus eliminating much of the friction present with respect to conventional sprockets.

FIG. 6 shows a modified connecting link L–3 which is the same as link L–1 except that the outer surface 35a is substantially straight up to the shoulder 35 rather than being tapered as is the surface 35b of the link L–1.

In FIGURE 7, a conventional sprocket S–1 is illustrated, and each of the saw chain links is shown with a drive surface 16' which is tapered to conform with the drive surfaces 60 on the sprocket S–1. It is also to be noted that the saw chain links C–1 and C–2 are reversed in the form of the invention shown in FIG. 7 as compared to the position of such links in FIG. 4. Thus, the surface 10 on the link C–1 is to the rear of each element E–1 while the surface 15 is forwardly of each of such elements E–1, but the element E–1 may be identical to that illustrated in the previous drawings so long as it is positioned in a reverse direction and is modified so that the cutting edge 21' and the guide surface 20' are forwardly with respect to the shoulder 25. It will be appreciated that the sprocket S–1 may be used with the reverse saw chain links C–1 and C–2 and the reverse insert E–1 of FIG. 7, if the drive surfaces 14 are used instead of the surfaces 14'. Likewise, it will be appreciated that the conventional sprocket S–1 may be used with the form of the invention shown in FIG. 1, providing the curved drive surfaces 14 are modified to have the inclined and substantially straight inclined drive surfaces as indicated at 14' in FIG. 7. Various other modification and rearrangements will occur to those skilled in the art as a result of the disclosure herein.

FIG. 8 illustrates a modified insert element E–2. The element E–2 is a cutting element having a cutting surface 121, and such surface 121 corresponds basically with the surface 21 of the cutting element E. The element E–2 is formed with the internally curved surface 22 and the internally curved surface 23 of the cutting element E. Likewise, the element E–2 is formed with a shoulder 25 so that the element E–2 may be substituted for the element E in the saw chain assembly of FIG. 1. Likewise, it will be appreciated that the surface 25 may be reversed with respect to the surface 22 in the same manner as illustrated for the modified element E–1 of FIG. 7, if the elements C–1 and C–2 are reversed as shown therein.

A stabilizing element E–3 shown in FIG. 9 has an upper curved surface 70 which is adapted to engage in the groove or saw notch formed by the saw teeth or cutting elements E, E–1, or E–2. The inner or lower portions, including the surfaces 22, 23, and the shoulder 25, are preferably identical to that provided for the cutting elements E, E–1, or E–2. In the preferred form of the invention, the element E–3 is positioned alternately with respect to the cutting elements E to provide further stability and rigidity of the saw chain apparatus A during its endless movement about the saw bar guide B for cutting purposes.

It shuld be noted that the shelf 17 and the shoulder 25 are shown in alignment with a line extending between the centers of the pivot pins P–1 annd P–2 (FIG. 2). The illustrated position is preferred, although the intermediate surfaces 17 and 25 may be positioned above or below such longitudinal axis in some instances.

The foregoing disclosure and description of the invention are illustrative and explanatory thereof, and various changes in the size, shape, and materials as well as in the details of the illustrated construction may be made within the scope of the appended claims without departing from the spirit of the invention.

I claim:
1. A saw chain, including:
 (a) a first saw chain link;

(b) a second saw chain link;
(c) a connecting link extending between said first and second saw chain links;
(d) a first connecting pivot pin connecting one end of said first saw chain link to one end of said connecting link;
(e) a second connecting pivot pin connecting one end of said second saw chain link to the other end of said connecting link;
(f) said first saw chain link having an externally curved surface with a radius from the center of said first pivot pin and merging with a straight outer surface;
(g) said second saw chain link having an externally curved surface at its end which is adjacent to said first saw chain link, said curved surface having an intermediate flat shelf which extends towards said first saw chain link a distance which is greater than the radius of the curved surface which is disposed inwardly thereof;
(h) the adjacent ends of said first and second saw chain links being spaced apart;
(i) a removable insert element having a outer portion extending outwardly beyond the saw chain links and an inner portion adapted to be removably disposed in the sapce between the adjacent ends of said first and second saw chain links;
(j) said removable insert having a first internally curved surface generally conforming to said externally curved surface of said first saw chain link and terminating at its outer end with a portion of such surface in contact with said straight outer surface and at its inner end at a point inset from the closest point of said externally curved surface to said second saw chain link;
(k) said removable insert also having a second internally curved surface generally conforming to the curvature of said externally curved surface of said second saw chain link above said intermediate flat shelf and having a shoulder engageable with said flat shelf to thereby confine said element between said shelf on said second saw chain link and said straight outer surface on said first saw chain link to provide rigidity and minimum gouging during use of the saw chain; and
(1) said insert element being removable from its position between said saw chain links by a manual pivoting of said links to move said shelf upwardly a sufficient distance to enable said insert element to be moved outwardly and away from said links for replacement or repair.

2. The structure set forth in claim 1, wherein:
(a) said removable insert is a cutter tooth adapted to engage wood or other material for cutting same as the saw chain is moved in an endless path.

3. The structure set forth in claim 1, wherein:
(a) said removable insert element is a stabilizing element adapted to be disposed between cutter teeth for increasing the rigidity of the saw chain as it is moved in an endless path.

4. The structure set forth in claim 1, wherein:
(a) said intermediate shelf lies on an imaginary line between the centers of said first and second pivot pins when said saw chain links are disposed in longitudinal alignment with each other.

5. The structure set forth in claim 1, wherein:
(a) said insert element has a tab extending laterally from its side; and
(b) said connecting link has a shoulder on its outer surface engageable with said tab to further stabilize the insert element with respect to the saw chain links.

6. The structure set forth in claim 1, wherein:
(a) said connecting link has a tab extending from its lower portion towards said insert element; and
(b) said insert element having a surface on its inner portion which is engageable by said tab to further prevent jumping of said element relative to said saw chain links.

7. The structure set forth in claim 1, wherein:
(a) each of said first and second saw chain links is connected to duplicates thereof to form the endless saw chain; and
(b) each of said saw chain links has an inwardly extending drive surface adapted to be engaged by a drive surface adapted to be engaged by a drive sprocket for driving said endless saw chain.

8. The structure set forth in claim 7, including:
(a) a drive sprocket having a pair of substantially circular plates; and
(b) a plurality of sprocket sleeves mounted between said plates at substantially the same radial distance from the centers of said plates, each of said sleeves being adapted to engage one of said drive surfaces on said saw chain links.

References Cited
UNITED STATES PATENTS

| | | |
|---|---|---|
| 677,095 | 6/1901 | Nagel. |
| 2,749,950 | 6/1956 | Jamieson _____ 143—135 |
| 3,224,476 | 12/1965 | Chadwick _____ 143—135 |

DONALD R. SCHRAN, *Primary Examiner.*

U.S. Cl. X.R.

74—249